Feb. 2, 1932. L. KERN 1,843,166
FARE INDICATOR
Filed Dec. 15, 1926 8 Sheets-Sheet 1

Inventor:
Leo Kern
by
Attorney

Feb. 2, 1932.                L. KERN                1,843,166
                           FARE INDICATOR
                       Filed Dec. 15, 1926        8 Sheets—Sheet 2

Inventor:
Leo Kern
by
Harold D. Penney  Attorney

Feb. 2, 1932.   L. KERN   1,843,166
FARE INDICATOR
Filed Dec. 15, 1926   8 Sheets-Sheet 4

Feb. 2, 1932.   L. KERN   1,843,166
FARE INDICATOR
Filed Dec. 15, 1926    8 Sheets-Sheet 6

Fig.13
Fig.13a

Inventor:
Leo Kern
by
Harold D. Penney  Attorney

Feb. 2, 1932. L. KERN 1,843,166
FARE INDICATOR
Filed Dec. 15, 1926 8 Sheets-Sheet 7

Inventor:
Leo Kern
by
Attorney

Feb. 2, 1932.  L. KERN  1,843,166
FARE INDICATOR
Filed Dec. 15, 1926   8 Sheets-Sheet 8

Inventor:
Leo Kern
by
Harold D. Penner, Attorney

Patented Feb. 2, 1932

1,843,166

UNITED STATES PATENT OFFICE

LEO KERN, OF VILLINGEN, GERMANY, ASSIGNOR TO KIENZLE UHRENFABRIKEN AKTIENGESELLSCHAFT, OF SCHWENNINGEN-ON-THE-NECKAR, GERMANY, A CORPORATION OF GERMANY

FARE INDICATOR

Application filed December 15, 1926, Serial No. 154,978, and in Germany September 10, 1926.

My invention relates to improvements in fare indicators of the taximeter type and more particularly in fare indicators of this type provided with mechanism for printing tickets to be delivered to the passenger and control strips, the said printing mechanisms being operated by rocking the flag staff usual in fare indicators. In apparatus of this class the printed ticket is delivered by a delivering mechanism when setting the flag staff in zero position, so that the passenger is enabled to compare the fare printed on the ticket with the fare indicated by the fare indicator.

In fare indicators of this type such as are now in use the type roll of the printing mechanism printing the cent amounts is coupled with the corresponding indicating drum showing the cent amounts. But the type rolls printing the units and tenths of dollars are driven from the type roll printing the cents. I have found that in apparatus of this class the type rolls printing the dollars are not always correctly reset when resetting the indicating apparatus, and that there is no possibility of examining whether or not the said type rolls for dollar amounts have been correctly reset. If the resetting mechanism of the dollar type rolls is not correctly operated, a wrong figure is printed on the ticket and the control strip at the end of the next drive, because in such cases the said type rolls are not rotated from their zero positions. Further, errors in the indications of the tickets and control strips are occasionally caused by the cent rolls incorrectly carrying the values to the dollar printing rolls.

One of the objects of the improvements is to provide a fare indicator of the class referred to in which accuracy in the indications printed on the tickets and the control strip is insured, and in which the correct position of the type rolls can be ascertained, and with this object in view my invention consists in positively connecting each type roll with the indicating drum corresponding thereto. Therefore the positions of the type rolls necessarily correspond to the positions of the fare indicating drums also in the orders representing units and tenths of dollars. The resetting mechanisms of the fare indicating drums do not operate only the said drums but also the corresponding type rolls. Should the operation of a resetting mechanism be wrong, the error is directly perceived by the incorrect position of the corresponding indicating drum, and the said drum and the type roll connected therewith can be correctly reset by again rocking the flag staff. If however, the zero signs are displayed through all the peep holes of the fare indicator, then the type rolls printing units and tenths of dollars are necessarily likewise in their zero positions, because no additional resetting mechanisms are provided for the said type rolls. Further, the errors are avoided which in constructions now in use are caused by erroneous transmission of the values from the cent type roll to the dollar type rolls.

The size of a clock mechanism used for measuring and recording the time the car has been waiting depends on the power needed for rotating the type rolls. In constructions now in use the tickets and the control strips are simultaneously printed at the same side of the type rolls, the figures printed on the ticket being simultaneously printed by means of carbon paper or the like on the control strip. Thereby the spindles of the type rolls are subject to the heavy pressure exerted on the rolls by the platen, so that they must be comparatively strong in order to avoid bending and displacement of the bearings. Thereby the power required for operating the type rolls and the size of the clock mechanism are increased. In my improved fare indicator the power required for operating the type rolls and the size of the clock work are reduced by simultaneously printing the tickets and the control strip on opposite sides of the type rolls, the said type rolls being provided at diametrically opposite sides with corresponding types and rotating between platens movable in opposite directions, and the strip from which the tickets are cut and the control strip being located at opposite sides of the type rolls. Thus the ticket strip and the control strip are simultaneously pressed by their platens into engagement with the type rolls, so that the pressures exerted thereon compensate each other, and the shafts are relieved of lateral pressure and can be comparatively thin, thus reducing the friction of the mechanism and the power needed for operating the same. Accordingly a clock mechanism of reduced size and a comparatively weak spring can be provided, which can be more easily wound.

In order to relieve the spindles of the type rolls from any lateral pressure means are provided for simultaneously pressing the platens into engagement with the rolls. Suitable operating mechanism for the platens includes a toggle-joint connected at its ends with the platens and having its articulation movable in rectilinear direction. Thus both platens are positively connected so that they perform exactly uniform paths.

Preferably the printing mechanism is operated by the flag staff. Now, the power to be exerted on the flag staff should be as small as possible, and on the other hand the platens should act on the types of the type wheels with a certain blow. In my improved indicator the toggle-joint is operated in rectilinear direction by a cam engaging the same at the junction of the links and adapted to release the same for printing, whereupon printing is effected by means of a spring. The said cam disk is shaped so that the spring is gradually put under tension, so that the power needed is comparatively small, while after releasing the spring and the junction of the links a heavy blow is exerted.

When rapidly rocking the flag staff into zero position it might happen that the junction of the links of the toggle-joint is again engaged by the curved portion of the cam disk before printing is completed. Therefore means are provided for locking the flag staff when releasing the said junction and unlocking the same after printing.

Further, my invention relates to the ribbon mechanism, and the object of the improvements is to construct the said mechanism so that the ribbon can be readily exchanged. With this object in view my invention consists in mounting the said ribbon mechanism together with its guide and tension rollers on a plate which can be readily removed from the casing enclosing the printing mechanism.

Heretofore the indicating apparatus was combined with the printing mechanism. Therefore, for repairing one of the said apparatus, it is necessary to dismount the whole fare indicator. In my improved construction the printing apparatus is disposed on a frame which is removably mounted on the indicating apparatus of the fare indicator, and on the driving shafts for the individual apparatus of the printing mechanism such as the type rolls, the feeding mechanisms for the ticket and control strips and the driving mechanism of the platens, driving members are provided which, when connecting the printing mechanism and the indicating mechanism, are coupled with driving members mounted on the said indicating mechanism. Therefore, for example for repairing the printing mechanism, all that is necessary is to dismount the said frame, while the indicating mechanism is not dismounted.

In constructions now in use the control strip is taken from a spool and passed along the printing mechanism, and after printing it is wound on a roller contained within a closed casing, the said roller being rotated for pulling the strip past the printing mechanism and winding the same. In this construction the connection of the control strip to the said roller is complicated, and much time is needed for taking the same from the casing. In my improved construction the mechanism for gathering the control strip is located in front of the winding casing, and it is freely passed into the said casing and over a curved guide way extending into the casing, the said guide way being yieldingly mounted so that it can automatically follow the increase in the diameter of the roll formed by the strip being wound. The strip is thus readily wound into a roll because only the outer coil thereof slides on the guide way, so that the friction is small. Therefore, for winding the control strip it is not necessary first to fix the same to a spool or reel, and it can be readily removed from the casing. Further, it can be readily ascertained whether or not by opening the casing of the control strip a non-authorized person has torn off a part of a control strip having fares recorded thereon, because the end of the strip must always exactly fit to the end of the strip which has before been removed.

In the preferred construction the said yieldable guide way is mounted on a hinged lid which can be rocked out of the casing, and which therefore provides means for ejecting the wound control strip.

Heretofore the date of the printing of the ticket has been set by means of date rollers projecting from the casing of the fare indicator and rigidly connected with the date type rollers. Therefore any date could be set by non-authorized persons.

Another object of the improvements is to construct the date printing mechanism so that only authorized persons are enabled to set the date thereon. With this object in view my invention consists in disposing the date setting rollers on a key adapted to be passed into the casing of the fare indicator and to throw coupling members of the spindles of the date rollers into engagement with corresponding coupling members of the type rolls. Therefore only an authorized person having the said key is enabled to set the date.

To prevent a third person who by accident is in non-authorized possession of a key from setting a date, provision is made that the date can be set only when removing the ticket and control strips. For this purpose a locking plate is provided at the key-hole through which the date roller is inserted, which locking plate is so connected, by locking members, with the lock to be opened for exchanging the ticket and control strips, that it closes the key-hole while the said lock is closed and opens the same only after opening the lock. By thus locking the locking plate by the said lock the date can be set only by a person who also is in possession of a key for the lock of the casing enclosing the printed control strip.

For the purpose of explaining the invention an example embodying the same has been shown in the accompanying drawings, in which the same reference characters have been used in all the views to indicate corresponding parts. In said drawings.

Figure 1:
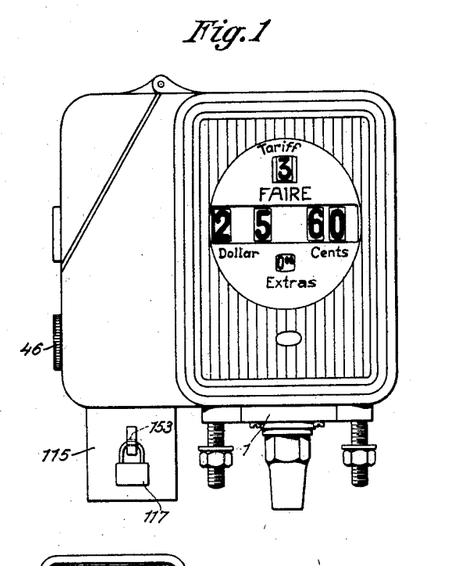
Fig. 1 is an elevation of the fare indicator.

In the fare indicator shown by way of example in the accompanying drawings the rotary movement of the car wheel is transmitted through gear wheels and a driving member 2 to a cam disk 3 by means of which a lever 4 is operated. On the lever 4 a pawl 5 is mounted which is adapted to impart intermittent rotary movement to a ratchet wheel 6 connected with a cent indicating drum 9 mounted on a shaft 9′ by means of bevel gear wheels 7 and 8. The said cent drum is connected by carrying mechanism with a drum 10 indicating units of dollars, and the drum 10 is connected by carrying mechanism with a drum 11 indicating tenths of dollars, the said drums cooperating to display the fare through peep holes made in the front wall of the casing, as is best shown in Fig. 1. The mechanism so far described is known in the art and I deem it not necessary to describe the same in detail.

Figure 12:
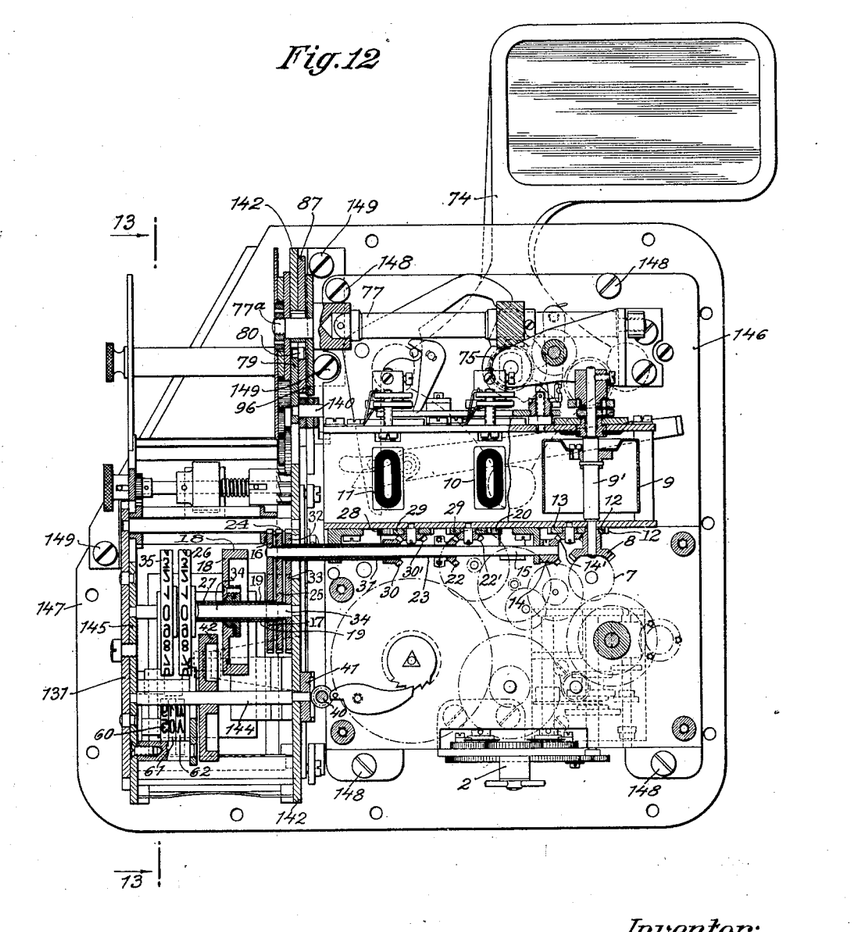
Fig. 12 is a sectional elevation taken on the line 12—12 of Fig. 11.

The drums 9, 10 and 11 are positively coupled with corresponding type rolls. The rotary movement of the cent drum 9 is transmitted through gear wheels 12, 13, bevel gear wheels 14, 14′, a shaft 15, and gear wheels 16 and 17 to the cent type roll 18, said type roll and the gear wheel 17 being fixed to a tubular shaft 19. In a similar way the rotary movement of the drum 10 indicating the units of dollars is transmitted through gear wheels 20, 21, bevel gear wheels 22, 22′, a tubular shaft 23, gear wheels 24, 25, and a tubular shaft 27 to a printing roller 26 adapted to print the units of dollars, the drum 26 and the spur gear 25 being mounted on the tubular shaft 27. The rotary movement of the drum 11 indicating tenths of dollars is transmitted through gear wheels 28, 29, bevel gear wheels 30, 30′, a tubular shaft 31, and gear wheels 32, 33 to a printing roller 35, the roller 35 and the spur gear 33 being keyed to a solid shaft 34. As appears more particularly from Fig. 12, the shafts 15, 23 and 31 on the one hand and the shafts 19, 27 and 34 on the other hand are telescopingly mounted one within the other.

The drums 9, 10 and 11 are provided with resetting mechanism of known construction, which resetting mechanisms have not been shown in the figures. It will be understood that by the resetting operation of the drums 9, 10 and 11 the rollers 18, 26 and 35 are likewise reset. By thus positively connecting the drums 9, 10 and 11 with the corresponding type rolls 18, 26 and 35 the positions of the type rolls can be readily ascertained, the positions of the said type rolls and more particularly the zero positions thereof corresponding exactly to the positions of the drums 9, 10 and 11.

Figure 3:
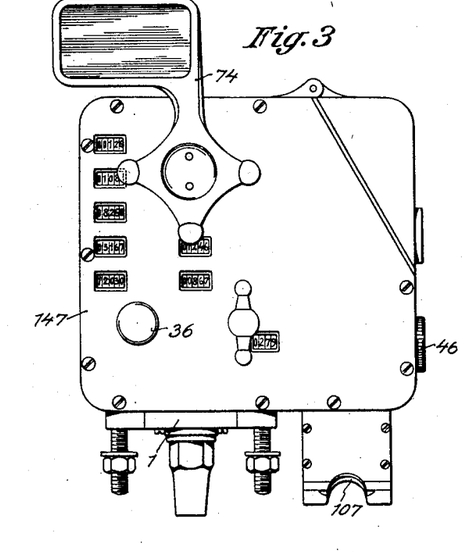
Fig. 3 is an elevation of the fare indicator similar to the one shown in Fig. 1 but looking from the rear of the indicator.
Figure 4:
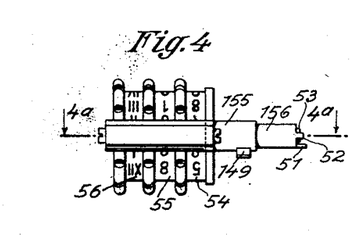
Fig. 4 is an elevation showing a key for setting the date in the fare indicator.
Figure 4A:
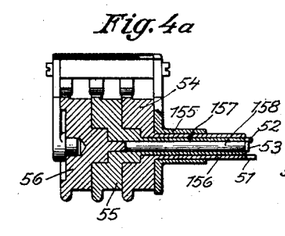
Fig. 4a is a sectional elevation of the said key taken on the line 4a—4a of Fig. 4.
Figure 5:
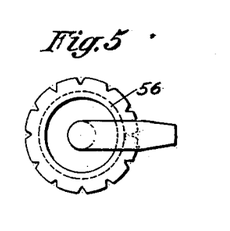
Fig. 5 is an end view of the key looking from the left in Fig. 4.
Figure 6:
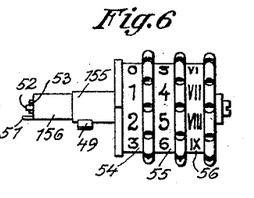
Fig. 6 is an elevation similar to the one shown in Fig. 4 but looking from the rear side of the key.
Figure 7:
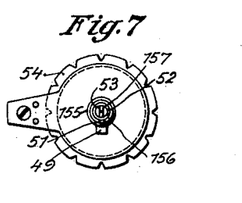
Fig. 7 is an end view looking from the left in Fig. 6.
Figure 7A:
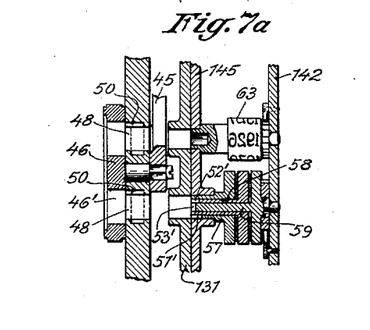
Fig. 7a is a sectional elevation taken on the line 7a—7a of Fig. 2, showing the date rolls.
Figure 8:
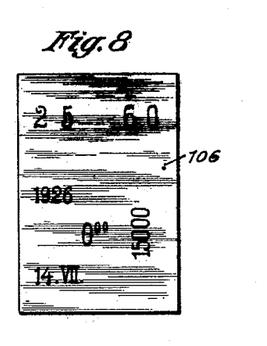
Fig. 8 shows a ticket having a fare and other matter printed thereon.
Figure 9:
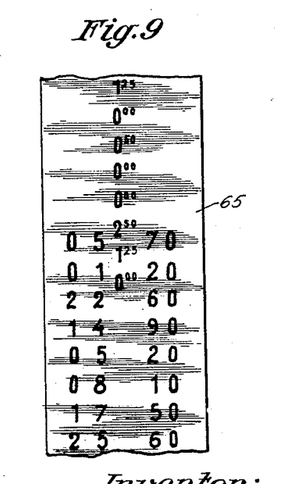
Fig. 9 shows the record strip.
Figure 10:
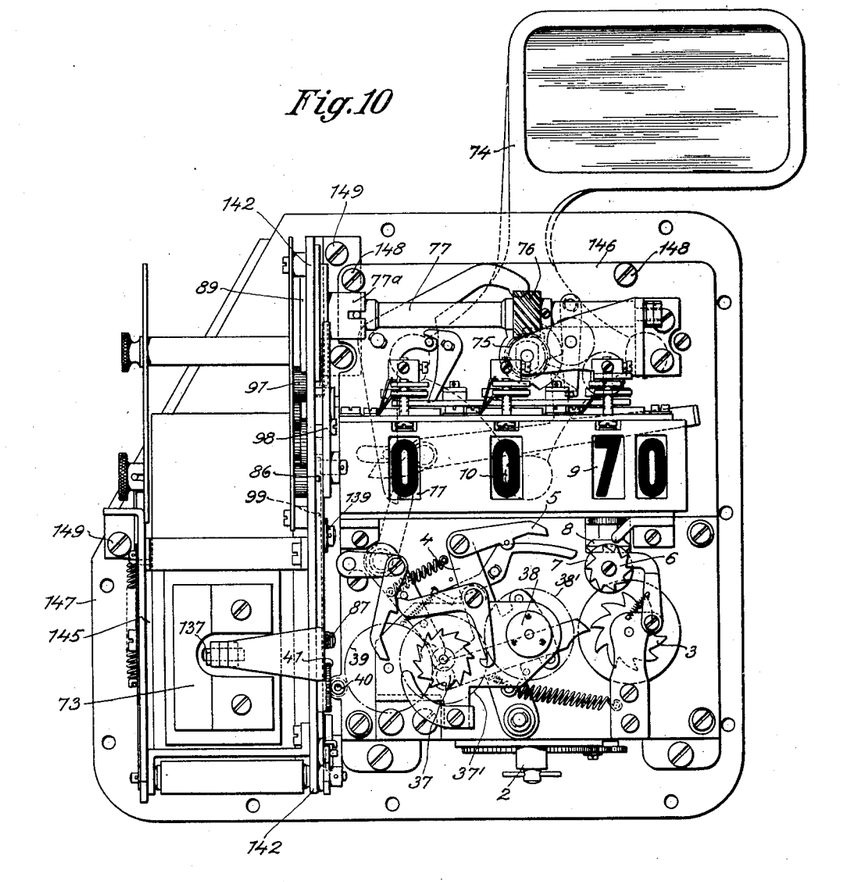
Fig. 10 is an elevation showing the fare indicator on an enlarged scale and with the casing removed.
Figure 11:
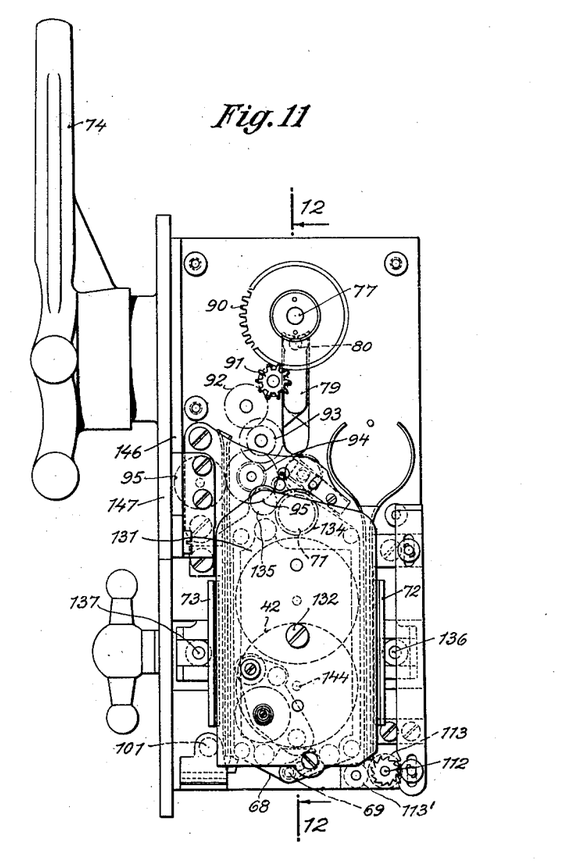
Fig. 11 is an elevation looking from the left in Fig. 10.

Means are provided for entering extra charges into the mechanism, which means comprise a knob 36 shown in Fig. 3 and adapted to operate a ratchet wheel 37. From the said ratchet wheel the extra charges are transmitted through gear wheels 37', 38', to a roller 38 adapted to display the extras through a peep hole made in the front wall of the casing, and through gear wheels 39, 40 and and a crown wheel 41 to a type roll 42.

The type rolls 18, 26, 35 and 42 are provided at diametrically opposite parts of their circumferences with similar types for printing the fare on the ticket as well as on the control strip, and they are located between two platens 72 and 73 adapted to be moved in opposition to each other for simultaneously printing the figures on the tickets and the control strip. The tickets are adapted to be cut from a strip 64 passed with its front end between the platen 72 and the adjacent sides of the type rolls, and the control strip is passed between the platen 73 and the opposite sides of the type rolls, an endless inking ribbon being passed between the said rolls and the strips.

The endless inking ribbon 68 is trained on guide rollers 133, and it is held under tension by a roller 69. The ribbon feed mechanism comprises two feed rollers 70 and 71 made from felt, the roller 71 being driven from the driving mechanism for the ticket strip 64 through the intermediary of gear wheels 134, 135 and 94, the gear wheel 94 being a part of the train of gear wheels by means of which the ticket strip is fed.

Figure 17:
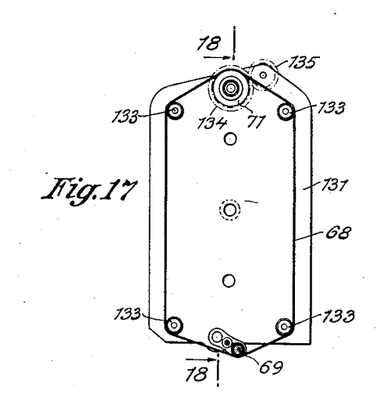
Fig. 17 is an elevation showing the plate carrying the inking apparatus.
Figure 18:
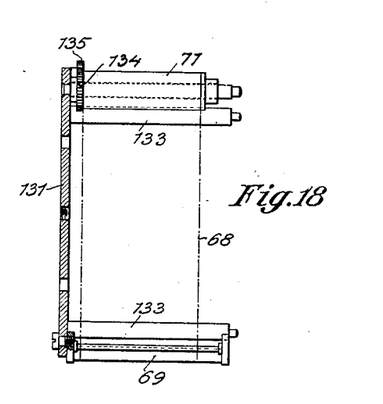
Fig. 18 is a sectional elevation taken on the line 18—18 of Fig. 17.

The ribbon mechanism including the ribbon 68, the guide rollers 133, the feed roller 71, the tension roller 69, and gear wheels 134, 135 are mounted on a plate 131 removably fixed to the frame of the printing mechanism by means of screws 132, and adapted to be removed from the said frame together with the inking mechanism after lifting the roller 70. Thus I am enabled readily to remove the inking mechanism from the apparatus for putting in a new ribbon.

The platens 72 and 73 are jointed at 136 and 137 to levers 85 and 86 rockingly mounted on pivot bolts 138 and 139. At their outer ends the said levers are connected by links 83 and 84 jointed to each other by a bolt 140 mounted on a slide 79 guided in a slot 141 of the base plate 142 of the printing mechanism, the said slot 141 being directed towards the axes of the type rolls 18, 26 and 35. The levers 83, 84, 85 and 86 provide a toggle-joint. The bottom ends of the levers 85 and 86 are connected with each other by a spring 87 adapted to be put under tension when moving the slide 79 upwardly.

A pin 80 fixed to the top end of the slide 79 is adapted to be engaged by an annular cam 78 having an inner concentric cam face 81 and an eccentric cam face 88 provided by an open portion 143 of the cam 78. The eccentric cam face 88 has a small pitch, so that the vertical displacement of the pin 80 corresponds to a comparatively long path of the cam face 88. The annular cam 78 is fixed to a shaft 77 positively connected with the flag 74 by means of helical gear wheels 75 and 76.

Figure 14:
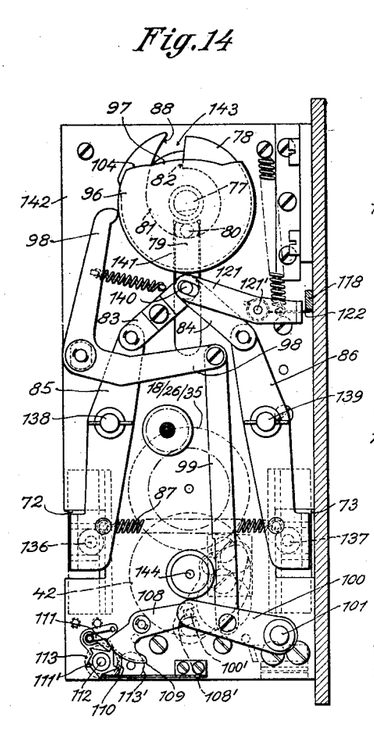
Fig. 14 is an elevation showing the mechanism for operating the platens of the printing apparatus.
Figure 15:
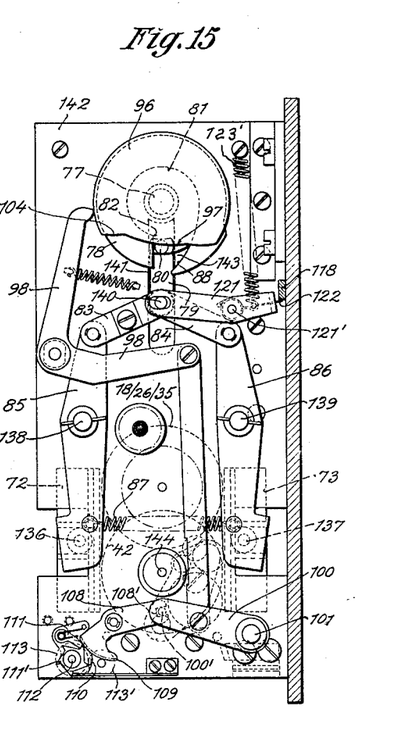
Fig. 15 is a similar elevation showing the parts in different positions.
Figure 16:
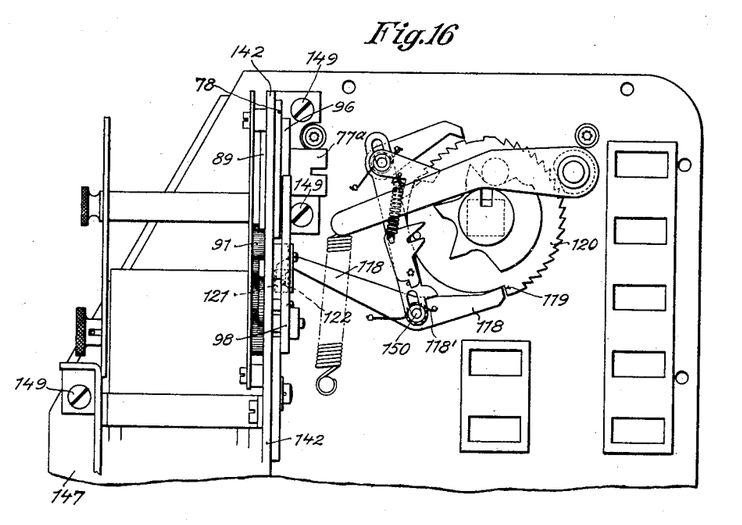
Fig. 16 is an elevation showing a part of the rear wall of the indicator.

In the position of the pin 80 shown in Fig. 14 the fare indicator is in its out of service position. For setting the same in service position the flag 74 and the shaft 77 are rocked, whereby the cam disk 78 is rotated, and the pin 80 slides on the concentric portion 81, until it arrives at the edge 82 thereof, as is shown in Fig. 15, in which position the pin 80 is released, and the slide 79 is thrown downwardly by the spring 87. Thus the platens 72 and 73 are suddenly thrown towards each other and on the opposite faces of the type rolls 18, 26, 35 and 42 for printing the figures set on the said rolls on the strips 64 and 65. When further rocking the flag 74 the eccentric portion 88 of the cam face engages the pin 80 and lifts the same, thus retracting the platens 72 and 73 away from the type rolls. The power required for thus retracting the platens is comparatively small by reason of the small eccentricity of the portion 88 of the cam face.

When printing the shafts 19, 27, 34 and 144 of the type rolls are relieved of laterally directed pressure by the platens 72 and 73 simultaneously striking on opposite portions of the said rolls. Therefore the shafts can be made comparatively thin, which is important for reducing the frictional resistance of the mechanism and the power needed for operating the same. Accordingly, the clock mechanism provided for recording the time the driver is waiting may be comparatively light, and it may be provided with a weak spring so that it can be readily wound. The simultaneous operation of the platens 72 and 73 is insured by the toggle-joint 83 to 86 connecting the same with the slide 79. Further, clear printing is insured by throwing the platens towards the type rolls.

When the flag and the cam disk 78 are rapidly rotated after the pin 80 has left the concentric cam face 81, the pin 80 is liable to be re-engaged by the eccentric cam face 88 before the platens 72 and 73 have acted on the type rolls, so that the types are not printed on the strips 64 and 65. In order to insure proper printing a locking lever 118 is provided, which is rockingly mounted on a bolt 150 and, when rotating the flag staff 77, a spring 118' throws the said lever into locking engagement with a lug 119 formed on a locking disk 120, thus preventing further rocking movement of the flag after the pin 80 has released the concentric portion 81 until the platens have been thrown against the rolls. After the platens have arrived in printing position the locking lever 118 is retracted from the disk 120 by means of a lever 121 rockingly mounted on a pivot bolt 121′ and carried along by the slide 79, so that the flag 74 can be further rotated. In order that the free movement of the lever 121 be not interfered with by the locking lever 118 being held in engagement with the disk 120 by friction a spring 122 is provided on the lever 121, which spring is adapted for engagement with the lever 118 and for being put under tension upon downward movement of the slide 79. When the cam 78 is suddenly arrested by the lever 118 impinging upon the lug 119 the driver will unvoluntarily slightly turn the cam backwardly, so that the lug 119 releases the lever 118 for a moment, so that the spring 122 has time to rock the lever 118 out of engagement with the lug 119.

A tension spring 123′ (Fig. 14) tends to move the lever 121 in an anticlockwise direction to cause this lever to press upon the bolt 140 and aid the spring 87 in pressing the platens to the type wheels.

After retracting the platens the ticket strip 64 is advanced one step by the operation of the flag 74 and the shaft 77. To the shaft 77 a wheel 89 is keyed which is provided about a part of its circumference with teeth 90 adapted for engagement with a gear wheel 91. After the platens 72 and 73 have been retracted by the cam disk 78 so far that the paper strips 64 and 65 are released the toothed segment 90 engages the gear wheel 91, and when further rotating the flag 74 rotary movement is imparted to the said gear wheel and, through the intermediary of gear wheels 92, 93 and 94, to rollers 95 made from rubber and engaging the ticket strip for feeding the same. Before the paper is fed a bell crank lever 98 bearing on a cam disk 96 keyed to the shaft 77 engages the portion 97 of the said cam disk, so that it is rocked downwardly by means of a link 99 connecting the said bell crank lever with an arm 100 keyed to a shaft 101. A pin 102 fixed to the said shaft retracts a blade 103, so that the paper strip fed by the rollers 95 can pass into a delivery passage 105. After the shaft 77 has been turned so far that the end 104 of the portion 97 of the face of the cam disk 96 engages the bell crank lever 98 for rocking the same upwardly, the blade 103 cuts the printed ticket 106 from the strip 64, so that the said ticket can be removed through the outlet 107 of the passage 105.

The control strip 65 is fed by means of the arm 100 which carries a pin 100′ engaging in a slot 108′ of a rocking lever 108 formed with a toothed segment 109 meshing with a toothed segment 110. On the said segment a pawl 111 is mounted which is in engagement with a ratchet wheel 111′ fixed to a shaft 112. On the said shaft a rubber roller 113 is mounted which cooperates with a rubber roller 113′ for feeding the strip 65 passed between the said rollers 113 and 113′. Thus the said rubber rollers feed the control strip one step into a casing 114 whenever a print has been made.

The printing mechanism, and more particularly the type rolls and their driving mechanism, the feeding mechanisms for the ticket and control strips and the operating mechanism of the platens are disposed between two plates 142 and 145. The indicating apparatus is disposed on a base plate 146, and both apparatus, viz. the indicating apparatus and the printing apparatus, are secured to a rear plate 147 by screws 148 and 149 respectively. Thus the printing mechanism can be readily removed from the indicating mechanism for repairing the same after loosening the screws 149. When thus removing the printing mechanism the shaft 77 located within the indicating apparatus disengages the shaft 77a by means of which the printing mechanism is operated. Further, the gear wheels 16, 24 and 32 connected with the indicating apparatus get out of engagement with the gear wheels 17, 25 and 33 fixed to the shafts of the type rolls. Finally, the driving wheel 40 of the shaft 144 of the type rolls for printing extras disengages the crown wheel 41 keyed to the shaft 144. Thus the printing apparatus can be readily removed from the fare indicator for repairing the same, without dismounting other parts of the apparatus.

The control strip 65 is automatically wound within the casing 114 without further winding means being provided.

As has been described above, the control strip 65 is fed by means of the rubber rollers 113 and 113′ and through a slot 151 into the casing 114. The said casing is open at its bottom, and the said opening is normally closed by means of a lid 115 hinged at 152 to the wall of the casing 114. The lid is adapted to be locked by means of a padlock 117 the shackle of which is adapted to be passed through an eye 153. Internally of the casing a leaf spring 116 is fixed at one end to the said lid by means of a rivet 154, which spring freely extends into the casing. As appears from Fig. 13 the said leaf spring is curved in the direction for winding the paper strip 65, and the open portion of the spiral thus provided is in position for receiving the paper strip passed into the casing through the slot 151, so that the strip is bent on the inner face of the spiral.

The strip may be torn off from time to time on the edge 117 formed on the wall of the casing, and if thereafter the lid 115 is again rocked upwardly for closing the casing, the end of the strip slides on the inner face of the spring 116, and it is bent thereon into annular form. After the front end of the strip has passed over the whole inner circumference of the spring 116 it slides on the inner face of the strip being passed into the casing until the friction between the parts of the strip exceeds that of the strip of paper on the inner face of the spring 116. As soon as the friction between the end of the strip and the first winding of the strip exceeds that between the said winding and the spring the strip is wound on the first or innermost winding without further reducing the inner diameter of the said winding.

Gradually the roll of the strip of paper formed within the casing 114 is increased thus expanding the spring 116, so that the automatic winding of the strip is not interfered with by the said spring.

Thus the friction of the strip 65 being wound within the casing 114 is caused exclusively by the engagement of the strip with the inner face of the spring 116, and it is comparatively small, so that the strip of paper is not bent by being advanced through the rollers 113 even if it is made from comparatively thin paper.

For removing the wound strip 65 from the casing 114 the lid 115 is opened, whereby the spring 116 and the wound strip of paper contained therein are removed from the casing. Now the wound strip is removed from the spring and torn on the edge 117.

It appears therefore that after removing a roll of paper from the casing 114 it is not necessary to fix the front end of the strip to a winding reel or the like, so that the wound strip of paper can be readily removed. The torn end of the strip shows a conspicuous configuration, which naturally exactly corresponds to the front end of the strip left within the indicator. Therefore, by holding corresponding ends together the superintendent can readily ascertain whether or not a part of the control strip having fares recorded thereon has been torn from the strip by unauthorized persons.

Figures 13, 13A:
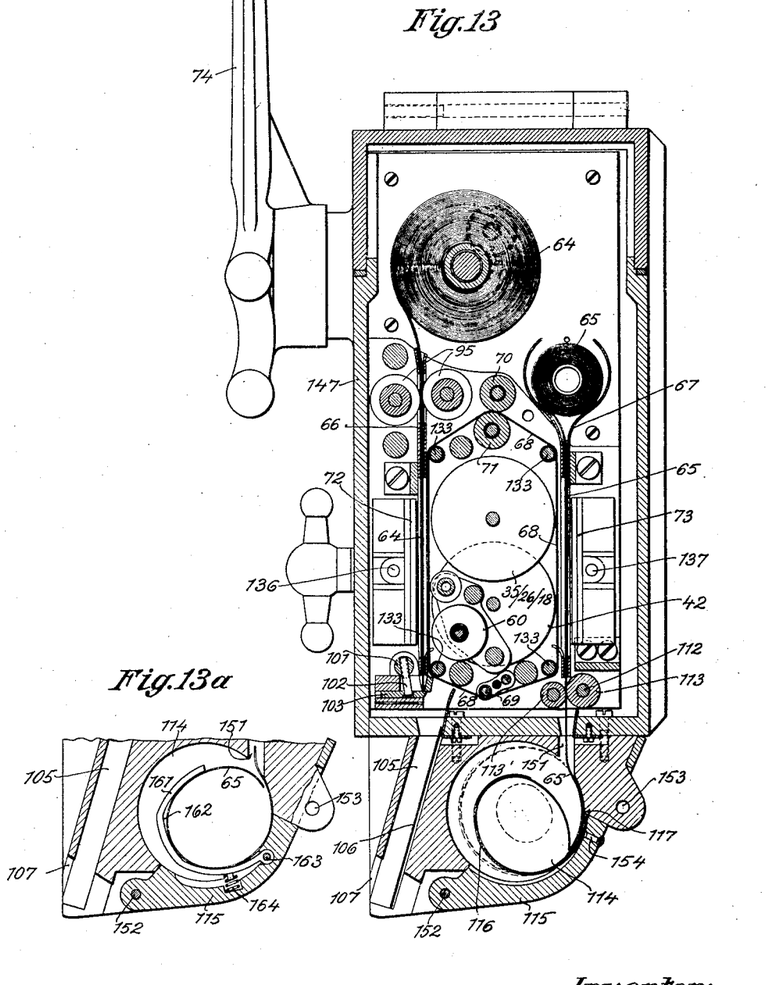
Fig. 13 is a sectional elevation taken on the line 13—13 of Fig. 12.
Fig. 13a is a detail sectional view showing a modification of the apparatus for winding the printed record strip.

In lieu of the leaf spring 116 other suitable guide members for the strip of paper may be provided. In Fig. 13a I have shown a rigid guide member 161 having a curved guiding surface 162 and hinged to the lid 115 by means of a bolt 163. The said guide member is acted upon by a spring 164 yieldingly pressing the same into the casing 114. As the roll of the strip wound within the casing increases in diameter the guide member 161 is rocked outwardly until it engages the inner circumferential wall of the casing 114.

For setting the date on the fare indicator a key is provided, which is adapted to be inserted into and removed from the indicator. As appears from Figs. 4 to 7, the key comprises a tubular stem 155 having setting rollers 54, 55 and 56 rotatably mounted thereon. The key is provided with a bit 49 and it is adapted to be inserted into a key-hole 48 made in the front wall of the casing enclosing the printing mechanism and in line with the axes of date type rolls 60, 61, 62, the bit passing through a recess 50. The shafts 156, 157 and 158 of the rollers 54, 55 and 56 are telescopingly mounted one within the other and within the tubular stem of the key 155, and at their end faces they are formed with bits 51, 52 and 53 corresponding to recesses 51', 52', 53' made in the telescoping shafts 57, 58 and 59 of the date rolls 60, 61 and 62. When inserting the key 155 into the key-hole 48 the bits 51, 52 and 53 engage the recesses of the shafts 57, 58, 59, so that when turning a setting roller 54, 55 or 56 the date type roll is set accordingly. There is only a single recess 51' in shaft 57, only a single recess 52' in shaft 58' and only a single recess 53' in shaft 59. This permits interlocking at only one point of the relative rotary adjustment. The projections 51, 52 and 53 are of different lengths, which facilitates operative engagement of the key with the type wheel members. Any known or preferred means may be provided for locking the date type rolls in set positions. The type roll 63 indicating the year can be set by means of another key adapted to be inserted through a second hole 48.

The word "key" referring in the specification and claims to the key 155 is intended to indicate that this key is freely detachable and portable after the manner of an ordinary door key as distinguished from adding machine numeral keys and the like which are not freely removable or intended to be often removed.

By providing a key 155 of the character described only authorized persons having the key in possession are capable of setting the date, so that setting of the rolls by non-authorized persons is prevented.

The key-holes 48 can be closed by means of a plate 46 formed with holes 46'. For providing another safety as against non-authorized setting of the date the said plate is operatively connected with the lock 159, which must be unlocked before the ticket strip 64 and the control strip 65 can be removed from the printing apparatus.

Figure 2:
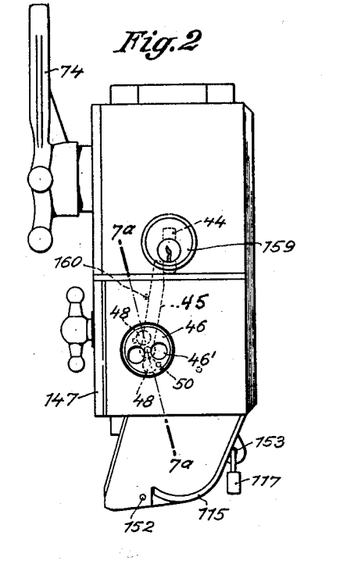
Fig. 2 is an elevation looking from the left in Fig. 1.

As shown the lock 159 is provided with a bolt 44 adapted to engage and move a lever 45 rigidly connected with the plate 46. Further, the said lever is adapted to engage a stop 160. The lever 45 is fixed so that in the locked position of the lock 159 shown in Fig. 2 it is located between the bolt 44 and the stop 160, so that it cannot be moved. In this position the key-holes 48 are covered by the plate 46, and it is impossible to turn the plate 46 for opening the key-holes 48 as long as the lock 159 is in locking position. When unlocking the lock the bolt 44 is turned so as to release the lever 45, whereupon the plate 46 can be turned, and the key 155 inserted through the key-hole 48.

Thus the date can be set only by a person having the key 155 carrying the date setting rollers and the key for the lock 159 in possession.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a taximeter, the combination, with indicating mechanism provided with indicating members rotatable on parallel axes, and printing mechanism provided with coaxial printing members, of direct connections intermediate corresponding indicating and printing members.

2. In a taximeter, the combination, with indicating mechanism provided with indicating members rotatable on vertical axes, and printing mechanism provided with printing members rotatable on horizontal axes, of direct connections intermediate corresponding indicating and printing members.

3. In a taximeter, the combination, with indicating mechanism provided with indicating members, and printing mechanism provided with printing members, of direct connections intermediate corresponding indicating and printing members, said connections comprising shafts disposed transversely of the axes of said indicating members and telescopingly mounted one within the other.

4. In a fare indicator, the combination, with the printing mechanism comprising a type roll provided at opposite sides with corresponding types, of means to feed strips to be printed upon respectively along opposite sides of said roll, platens in position for pressing said strips on opposite sides of the type roll, and means including a toggle-joint and a spring for actuating the toggle joint for simultaneously pressing said platens on said type roll.

5. In a fare indicator, the combination, with the printing mechanism comprising a type roll provided at opposite sides with corresponding types, of means to feed strips to be printed upon respectively along opposite sides of said roll, platens in position for pressing said strips on opposite sides of the type roll, means including a toggle-joint for simultaneously pressing said platens on said type roll, a cam formed with an abrupt portion and with a gradually rising portion engaging said joint and adapted to retract the platens from the roll and to release the same, and automatic means tending to throw the platens towards the roll.

6. In a fare indicator, the combination, with the printing mechanism comprising a type roll provided at opposite sides with corresponding types, of means to feed strips to be printed upon respectively along opposite sides of said roll, platens in position for pressing said strips on opposite sides of the type roll, means including a toggle-joint for simultaneously pressing said platens on said type roll, a cam formed with an abrupt portion and with a gradually rising portion engaging said joint and adapted to retract the platens from the roll and to release the same, and a spring connecting said platens and adapted to throw the same towards said roll.

7. In a fare indicator, the combination, with the printing mechanism comprising a type roll provided at opposite sides with corresponding types, of means to feed strips to be printed upon respectively along opposite sides of said roll, platens in position for pressing said strips on opposite sides of the type roll, means including a toggle-joint for simultaneously pressing said platens on said type roll, a cam formed with an abrupt portion and with a gradually rising portion engaging said joint and adapted to retract the platens from the roll and to release the same, automatic means tending to throw the platens towards the roll, locking means for said cam, and mechanism operatively connected with said means connected with the platens and adapted to be released after said platens have been thrown against the roll.

8. In a fare indicator, the combination, with the printing mechanism and its frame, the printing mechanism being provided with type at opposite sides, of ink ribbon mechanism loosely connected with said printing mechanism and mounted on a member detachably connected with said frame of the printing mechanism and carrying ribbon portions at said opposite sides.

9. The combination, with the printing mechanism, of means to feed a record strip through said printing mechanism, and a yielding curved guide member in position for receiving said record strip on its inner face and shaped so as to bend the front end of the record strip inwardly and on the surface of the record strip being passed thereon.

10. In a fare indicator, the combination, with the printing mechanism, of means to feed a record strip through said printing mechanism, a casing in position for receiving the record strip printed upon and having an opening, a lid for closing said opening, a curved guide member fixed to said lid and located in position for receiving said record strip on its inner face and adapted to bend the front end thereof inwardly and on the inner face of the strip being passed on said curved guide member.

11. In a fare indicator, the combination, with the printing mechanism, of means to feed a record strip through said printing mechanism, a casing in position for receiving the record strip printed upon, and a spirally bent leaf spring within said casing in position for receiving said record strip on its inner face and bent inwardly so far that the forward end of the strip is bent thereby on the inner surface of the strip being passed on said spring.

12. In a fare indicator, the combination, with the printing mechanism, of means to feed a record strip through said printing mechanism, a casing in position for receiving the record strip printed upon, a curved guide member mounted within said casing in position for receiving the record strip, said casing being formed with a cylindrical wall cooperating with said guide member for bending the forward end of said record strip inwardly and on the surface of the record strip being passed on said guide member.

13. In a fare indicator, the combination, with the frame, the indicating apparatus and the printing apparatus both mounted on said frame, a casing enclosing said printing apparatus, and a lid for closing said casing and provided with a lock, of a date roll forming a part of said printing apparatus, said casing being formed with a key-hole through which said date roll is accessible, a disk for closing said key-hole, and operating means intermediate said disk and said lock for setting said disk into position for opening the key-hole.

14. A taximeter comprising indicating members having parallel axes; coaxial printing members; and means directly connecting the indicating members to the printing members respectively.

15. A taximeter comprising indicating members arranged side by side on vertical axes; coaxial printing members arranged side by side; and means directly connecting the indicating members to the printing members respectively.

16. In combination, a type roll; platens associated with opposite sides of the roll; a toggle joint connecting said platens; a spring device for operating the toggle joint to press the platens to the type; and means for retracting said device.

17. In combination, a type roll; platens associated with opposite sides of the roll; a toggle joint connecting said platens; a spring tending to press the platens to the type.

18. In combination, a plurality of shafts; type rolls on the shafts respectively and a detachable key comprising relatively adjustable stems constructed to actuate the shafts respectively, and means carried by, and detachable with, the key for holding said stems together.

19. In combination, a fare indicator having a printing mechanism; a detachable ribbon mechanism for the printing mechanism comprising a detachable plate and feed and guide ribbon-rolls on the plate; and a means for setting and controlling the indicator and operating said feed rolls.

20. In combination, a casing having a lid and a key hole; a printing apparatus in the casing having a date roll accessible through the key hole; a lock for said lid; and a closure means for the keyhole controlled by said lock.

21. In combination, a casing having a closure means and a keyhole; a closure means for the keyhole a printing device in the casing accessible through the keyhole; and a lock controlling both of said closure means.

22. In combination a taximeter comprising a fare indicating mechanism having fare indicating members; a printing mechanism comprising a support and printing wheels mounted thereon detachably connected to corresponding indicating members; said printing mechanism including the support and printing wheels being detachable, as a unit separable in assembled form, from the taximeter without disabling the fare indicating mechanism; said taximeter being operative while the printing mechanism is detached.

23. In combination, a casing; a plurality of coaxial tubular shafts in said casing arranged for independent adjustment; a detachable key comprising relatively rotatably adjustable telescopic tubular key stems having their inner ends adapted to engage with outer ends of said shafts respectively, to form therewith respective pairs of interengaging ends; means on each of said pairs respectively for interlocking said ends at one point only of their relative rotary adjustment and means upon said casing for detachably supporting said key.

24. In combination, a casing; a plurality of coaxial tubular shafts in said casing arranged for independent adjustment; a detachable key comprising relatively rotatably adjustable telescopic tubular key stems having their inner ends adapted to engage with outer ends of said shafts respectively, to form therewith respective pairs of interengaging ends; one end of each of said pairs being formed with a single recess, the other end of such pair having a single projection engaging in such recess to permit interlocking at one point only of their relative rotary adjustment; and means upon said casing for detachably supporting said key.

25. In combination, a casing; a plurality of coaxial tubular shafts in said casing arranged for independent adjustment; a detachable key comprising relatively rotatably adjustable telescopic tubular key stems having their inner ends adapted to engage with outer ends of said shafts respectively, to form therewith respective pairs of interengaging ends; one shaft end of each of said pairs being formed with a recess, the key stem end of such pair having a projection engaging in such recess to permit interlocking; said projections being of different length to facilitate operative engagement of the key with the shafts; and means upon said casing for detachably supporting said key.

26. In combination, a casing; a plurality of coaxial tubular shafts in the casing arranged for independent adjustment; a detachable key comprising relatively rotatably adjustable telescopic tubular key stems having their inner ends adapted to engage with outer ends respectively, to form therewith respective pairs of interengaging ends; one end of each of said pairs being formed with a single recess, the other end of such pair having a single projection engaging in such recess to permit interlocking at one point only of their relative rotary adjustment; said projections being of different length to facilitate operative engagement of the key with the shafts; and means upon said casing for detachably supporting said key.

In testimony whereof I hereunto affix my signature.

LEO KERN.